US008663046B2

(12) United States Patent
Torrelli

(10) Patent No.: US 8,663,046 B2

(45) Date of Patent: Mar. 4, 2014

(54) HYBRID TRANSMISSION FOR A MOTOR VEHICLE

(71) Applicant: Oerlikon Graziano SpA, Turin (IT)

(72) Inventor: Claudio Torrelli, Turin (IT)

(73) Assignee: Oerlikon Graziano S.p.A., Rivoli, Turin (IT)

(*) Notice: Subject to any disclaimer, the term of this patent is extended or adjusted under 35 U.S.C. 154(b) by 0 days.

(21) Appl. No.: 13/923,025

(22) Filed: Jun. 20, 2013

(65) Prior Publication Data

US 2013/0345008 A1 Dec. 26, 2013

(30) Foreign Application Priority Data

Jun. 26, 2012 (IT) .............................. TO2012A0565

(51) Int. Cl.
*F16H 3/72* (2006.01)

(52) U.S. Cl.
USPC ............................................................. 475/5

(58) Field of Classification Search
USPC ...................................... 475/5, 6, 1, 9; 477/5
See application file for complete search history.

(56) References Cited

U.S. PATENT DOCUMENTS

| | | | | |
|---|---|---|---|---|
| 6,896,635 | B2 * | 5/2005 | Tumback | 475/5 |
| 2002/0082134 | A1 * | 6/2002 | Hirt et al. | 477/3 |
| 2004/0048710 | A1 * | 3/2004 | Tumback | 475/5 |
| 2005/0032598 | A1 | 2/2005 | Hanyu et al. | |
| 2007/0060432 | A1 * | 3/2007 | Van Druten et al. | 475/5 |
| 2011/0190084 | A1 * | 8/2011 | Zerbato et al. | 475/5 |
| 2011/0239820 | A1 | 10/2011 | Shibahata | |

FOREIGN PATENT DOCUMENTS

| | | | |
|---|---|---|---|
| EP | 1 232 891 | A1 | 8/2002 |
| EP | 2 447 571 | A1 | 5/2012 |

OTHER PUBLICATIONS

Italian Search Report for corresponding Italian Patent Application No. TO2012A000565 mailed Feb. 15, 2013.

* cited by examiner

*Primary Examiner* — David D Le
*Assistant Examiner* — David J Hlavka
(74) *Attorney, Agent, or Firm* — Merchant & Gould P.C.

(57) ABSTRACT

A transmission includes a main gearbox and an electric machine. The main gearbox has a primary shaft, a secondary shaft and gear sets, each having a driving gearwheel carried by a respective primary shaft and a driven gearwheel carried by a respective secondary shaft. A first gearwheel and a second gearwheel meshing with each other are idly mounted on the primary shaft and on the secondary shaft, respectively, and are selectively connectable for rotation with the respective shaft by a first coupling device and of a second coupling device, respectively. The electric machine is releasably connected to the first gearwheel or to the second gearwheel, such that with the first coupling device in an engaged position the electric machine is able to transmit torque to the primary shaft on which the first gearwheel is mounted, while with the second coupling device in an engaged position, the electric machine is able to transmit torque to the secondary shaft on which the second gearwheel is mounted. The transmission further includes a secondary gearbox with two or more gears between the electric machine and the first or the second gearwheel.

8 Claims, 15 Drawing Sheets

10 12 20 28 14 16 22 24

HYBRID TRANSMISSION FOR A MOTOR VEHICLE

BACKGROUND OF THE INVENTION

The present invention relates to a hybrid transmission for a motor vehicle, comprising a main gearbox, which is made as a mechanical gearbox with a plurality of gear ratios and is adapted to be connected to a drive shaft of the internal combustion engine of the vehicle, and a single electric machine which is connected to the main gearbox so as to assist the internal combustion engine of the vehicle in producing the driving torque to be transmitted to the vehicle wheels.

Hybrid transmissions for motor vehicles, both of the single-clutch type and of the double-clutch type, are known, in which the electric machine is permanently connected or selectively connectable to a primary shaft or to a secondary shaft of the main gearbox so as to be able to transmit torque to that shaft or receive torque from that shaft. The electric machine is thus able to perform not only the main functions of traction (generation of mechanical power for the vehicle wheels by taking energy from the batteries of the vehicle) and of regeneration (generation of electrical power for the batteries of the vehicle by recovering the kinetic energy of the vehicle or by exploiting the internal combustion engine when it runs with the vehicle being stationary), but also auxiliary functions such as for example the functions of alternator and of starting motor.

EP-A-1 232 891 discloses a hybrid transmission for a motor vehicle, comprising a main gearbox and a single electric machine, wherein the main gearbox is a mechanical gearbox with a plurality of gears and comprises at least one primary shaft adapted to be connected to a drive shaft of the internal combustion engine of the vehicle, and at least one secondary shaft adapted to be connected to the vehicle wheels. The electric machine is releasably connected both to the at least one primary shaft and to the at least one secondary shaft by means of a connection gear set, which includes a first gearwheel idly mounted on the at least one primary shaft and a second gearwheel idly mounted on the at least one secondary shaft and directly or indirectly meshing with the first gearwheel, so as to allow the transmission of the torque between the electric machine and the at least one primary and secondary shafts. The transmission further comprises a first coupling device interposed between the electric machine and the at least one primary shaft to control the connection between the electric machine and this shaft, and a second coupling device interposed between the electric machine and the at least one secondary shaft to control the connection between the electric machine and this shaft. The first coupling device is shiftable into an engaged position, in which it connects the first gearwheel for rotation with the respective primary shaft, and into a disengaged position, in which it disconnects the first gearwheel from the respective primary shaft. The second coupling device is shiftable at least into an engaged position, in which it connects the second gearwheel for rotation with the respective secondary shaft, and into a disengaged position, in which it disconnects the second gearwheel from the respective secondary shaft, in such a manner that with the first coupling device in the engaged position the electric machine is able to transmit torque to the primary shaft on which the first gearwheel is mounted, while with the second coupling device in the engaged position the electric machine is able to transmit torque to the secondary shaft on which the second gearwheel is mounted.

SUMMARY OF THE INVENTION

It is an object of the present invention to provide a hybrid transmission for a motor vehicle which offers a wider range of operating modes.

This and other objects are fully achieved according to the present invention by virtue of a hybrid transmission for a motor vehicle comprising, in addition to the features of the prior art already mentioned above, a secondary gearbox with two or more gears interposed between the electric machine and the first or second gearwheel, which secondary gearbox allows to change the transmission ratio between the electric machine and the main gearbox.

BRIEF DESCRIPTION OF THE DRAWINGS

Further characteristics and advantages of the present invention will become clear from the following detailed description, given purely by way of non-limiting example with reference to the appended drawings, in which.

DETAILED DESCRIPTION OF THE PREFERRED EMBODIMENTS

Figure 1:
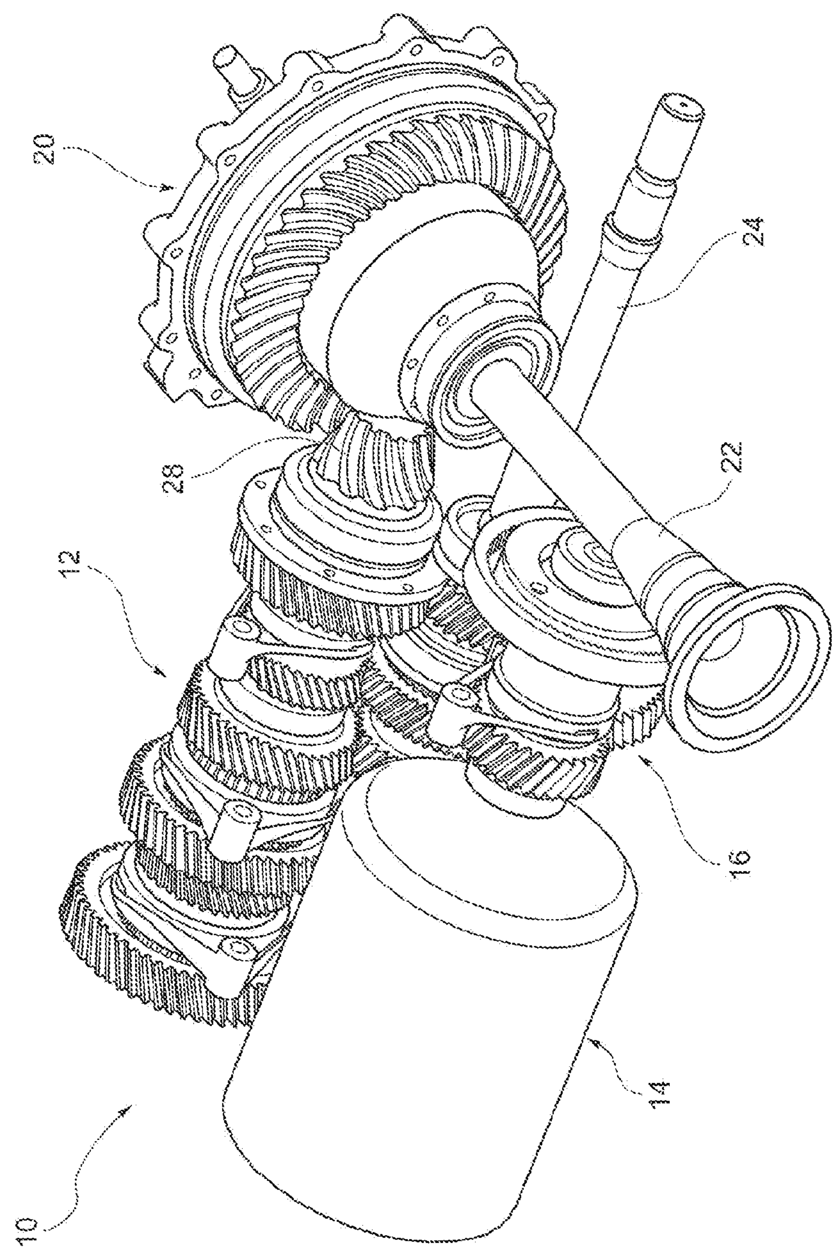
FIG. 1 is a perspective view of a hybrid transmission for a motor vehicle according to an embodiment of the present invention.
Figure 2:
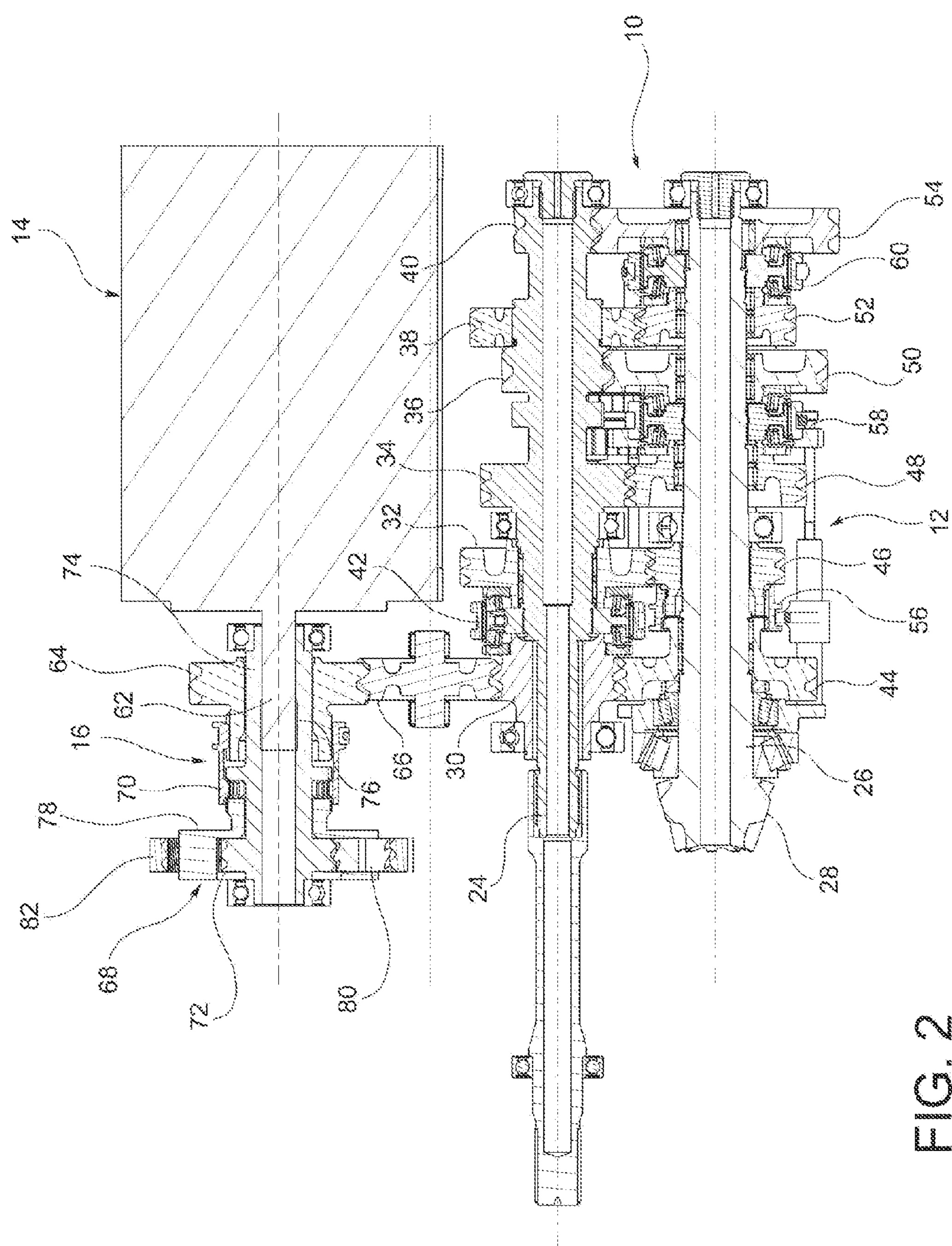
FIG. 2 shows the development in a plane of the cross-section of the transmission of FIG. 1.

With reference first to FIGS. 1 and 2, a hybrid transmission for a motor vehicle according to an embodiment of the present invention is generally indicated 10 and basically comprises a main gearbox 12 associated to the internal combustion engine of the vehicle, an electric machine 14 releasably connected to the main gearbox 12 and a secondary gearbox 16 associated to the electric machine 14. The main gearbox 12 is a mechanical gearbox (i.e. a gearbox provided with gearwheels) with a plurality of gears (in the proposed embodiment, a gearbox with six gears) and is designed to be connected on its input side to the internal combustion engine (not shown) of the vehicle through a friction clutch 18 (schematically shown in FIGS. 5 to 15) and on its output side to the vehicle wheels (not shown) through a differential gear 20 and a pair of semi-axles 22. The friction clutch 18, as well as the differential gear 20, are of per-se-known type and do not play any role in the present invention, and therefore will not be described in detail in the following description. The electric machine 14 may be connected both to the input side and to the output side of the main gearbox 12 and is therefore able to exchange (i.e. to transmit and receive) torque both with the internal combustion engine and with the vehicle wheels, according to a plurality of operating modes that will be illustrated in detail further on. The secondary gearbox 16 is interposed between the electric machine 14 and the main gearbox 12 to change the transmission ratio with which the electric machine 14 transmits/receives the motion to/from the main gearbox 12.

In the proposed embodiment, the transmission is of the single-clutch type and therefore the main gearbox 12 comprises a single primary shaft 24 torsionally connectable to the drive shaft of the internal combustion engine of the vehicle by means of the friction clutch 18. Anyway, the transmission might even be of the double-clutch type, in which case the main gearbox would comprise, in per-se-known manner, two primary shafts, each connectable to the drive shaft of the internal combustion engine of the vehicle by means of a respective friction clutch. Moreover, in the proposed embodiment, the main gearbox 12 is a two-axis gearbox and therefore comprises a single secondary shaft 26 arranged parallel to the primary shaft 24. Anyway, the main gearbox 12 might even comprise more than one secondary shaft.

The primary shaft 24 of the main gearbox 12 carries a plurality of driving gearwheels (in the proposed embodiment, six driving gearwheels), each associated to a respective gear, while the secondary shaft 26 carries a corresponding plurality of driven gearwheels, each permanently meshing with a respective driving gearwheel to implement a respective gear. The secondary shaft 26 also carries a final reduction pinion 28 arranged to mesh with an input gearwheel of the differential gear 20. More specifically, in the proposed embodiment the primary shaft 24 carries, in the order from left to right with respect to a person looking at FIG. 2, a driving gearwheel 30 associated to the third gear, a driving gearwheel 32 associated to the sixth gear, a driving gearwheel 34 associated to the fourth gear, a driving gearwheel 36 associated to the second gear, a driving gearwheel 38 associated to the fifth gear and a driving gearwheel 40 associated to the first gear. The driving gearwheels 34, 36, 38 and 40 are made as fixed gearwheels and are therefore permanently connected for rotation with the primary shaft 24, while the driving gearwheels 30 and 32 are idly mounted on the primary shaft 24 and are selectively connectable for rotation with this latter by means of a coupling device 42 of per-se-known type. The coupling device 42 is shiftable into a first engagement position (left-hand position with respect to a person looking at FIG. 2), in which it connects the driving gearwheel 30 for rotation with the primary shaft 24, into a second engagement position (right-hand position with respect to a person looking at FIG. 2), in which it connects the driving gearwheel 32 for rotation with the primary shaft 24, and into a neutral intermediate position, in which it does not connect either the driving gearwheel 30 or the driving gearwheel 32 for rotation with the primary shaft 24. In the proposed embodiment, the secondary shaft 26 carries, in the order from left to right with respect to a person looking at FIG. 2, a driven gearwheel 44 permanently meshing with the driving gearwheel 30 to form the gear set of third gear, a driven gearwheel 46 permanently meshing with the driving gearwheel 32 to form the gear set of sixth gear, a driven gearwheel 48 permanently meshing with the driving gearwheel 34 to form the gear set of fourth gear, a driven gearwheel 50 permanently meshing with the driving gearwheel 36 to form the gear set of second gear, a driven gearwheel 52 permanently meshing with the driving gearwheel 38 to form the gear set of fifth gear and a driven gearwheel 54 permanently meshing with the driving gearwheel 40 to form the gear set of first gear. Whilst the driven gearwheel 46 is made as a fixed gearwheel, and is therefore permanently connected for rotation with the secondary shaft 26, all the other driven gearwheels are idly mounted on the secondary shaft 26 and are selectively connectable for rotation with this latter by means of coupling devices of per-se-known type. More specifically, the secondary shaft 26 carries a coupling device 56 placed next to the driven gearwheel 44 (in the proposed embodiment, placed between the driven gearwheel 44 and the driven gearwheel 46) to connect this gearwheel for rotation with the secondary shaft 26, a coupling device 58 interposed between the driven gearwheels 48 and 50 to selectively connect either of these gearwheels for rotation with the secondary shaft 26 and a coupling device 60 interposed between the driven gearwheels 52 and 54 to selectively connect either of these gearwheels for rotation with the secondary shaft 26. The coupling device 56, which may indifferently be a synchronized one or a non-synchronized one, is shiftable between an engagement position (left-hand position with respect to a person looking at FIG. 2), in which it connects the driven gearwheel 44 for rotation with the secondary shaft 26, and a neutral position, in which it does not connect that gearwheel for rotation with that shaft. The coupling device 58 is shiftable between a first engagement position (left-hand position with respect to a person looking at FIG. 2), in which it connects the driven gearwheel 48 for rotation with the secondary shaft 26, and a second engagement position (right-hand position with respect to a person looking at FIG. 2), in which it connects the driven gearwheel 50 for rotation with the secondary shaft 26, passing through a neutral intermediate position, in which it does not connect either the driven gearwheel 48 or the driven gearwheel 50 for rotation with the secondary shaft 26. The coupling device 60 is shiftable between a first engagement position (left-hand position with respect to a person looking at FIG. 2), in which it connects the driven gearwheel 52 for rotation with the secondary shaft 26, and a second engagement position (right-hand position with respect to a person looking at FIG. 2), in which it connects the driven gearwheel 54 for rotation with the secondary shaft 26, passing through a neutral intermediate position, in which it does not connect either the driven gearwheel 52 or the driven gearwheel 54 for rotation with the secondary shaft 26.

Not only the number of shafts of the main gearbox 12, as already stated above, but also the number of gears and the arrangement of the gear sets associated to the various gears may of course vary from those disclosed herein, being it clear that at least one of the gear sets has both its driving gearwheel and its driven gearwheel idly mounted on the respective primary and secondary shafts of this gearbox. The gear set having both its driving gearwheel and its driven gearwheel idly mounted on the respective primary and secondary shafts of this gearbox is preferably the gear set associated to an intermediate gear of the main gearbox, i.e. neither to the lowest gear nor to the highest gear. In the proposed embodiment, in which the main gearbox has six gears, such a gear set is associated to the third gear.

As already stated above, the electric machine 14 is releasably connected both to the input side and to the output side of the main gearbox 12, namely through a gear set having both its driving gearwheel and its driven gearwheel idly mounted on the respective shafts. Such a gear set is preferably, although not necessarily, a gear set defining one of the gears of the main gearbox, in the present case the gear set of third gear. More specifically, the electric machine 14 is connected to the driving gearwheel 30 in such a manner that with the coupling device 42 in the first engagement position (i.e. with the driving gearwheel 30 connected for rotation with the primary shaft 24) the electric machine 14 transmits torque, through the driving gearwheel 30, to the primary shaft 24, while with the coupling device 56 in the engagement position (i.e. with the driven gearwheel 44 connected for rotation with the secondary shaft 26) the electric machine 14 transmits torque, through the driving gearwheel 30 and the driven gearwheel 44, to the secondary shaft 26. In the proposed embodiment, the electric machine 14 is arranged with its own output shaft (indicated 62) parallel to the shafts 24 and 26 of the main gearbox 12 and is connected to the driving gearwheel 30 of this gearbox through a gear set comprising an output gearwheel 64 connectable for rotation with the output shaft 62 and an intermediate gearwheel 66 permanently meshing both with the output gearwheel 64 and with the driving gearwheel 30. Between the output gearwheel 64 and the driving gearwheel 30 there might be other intermediate gearwheels, in addition to the gearwheel 66. The electric machine 14 might also be connected to the driven gearwheel 44, instead of the driving gearwheel 30.

Figure 3:
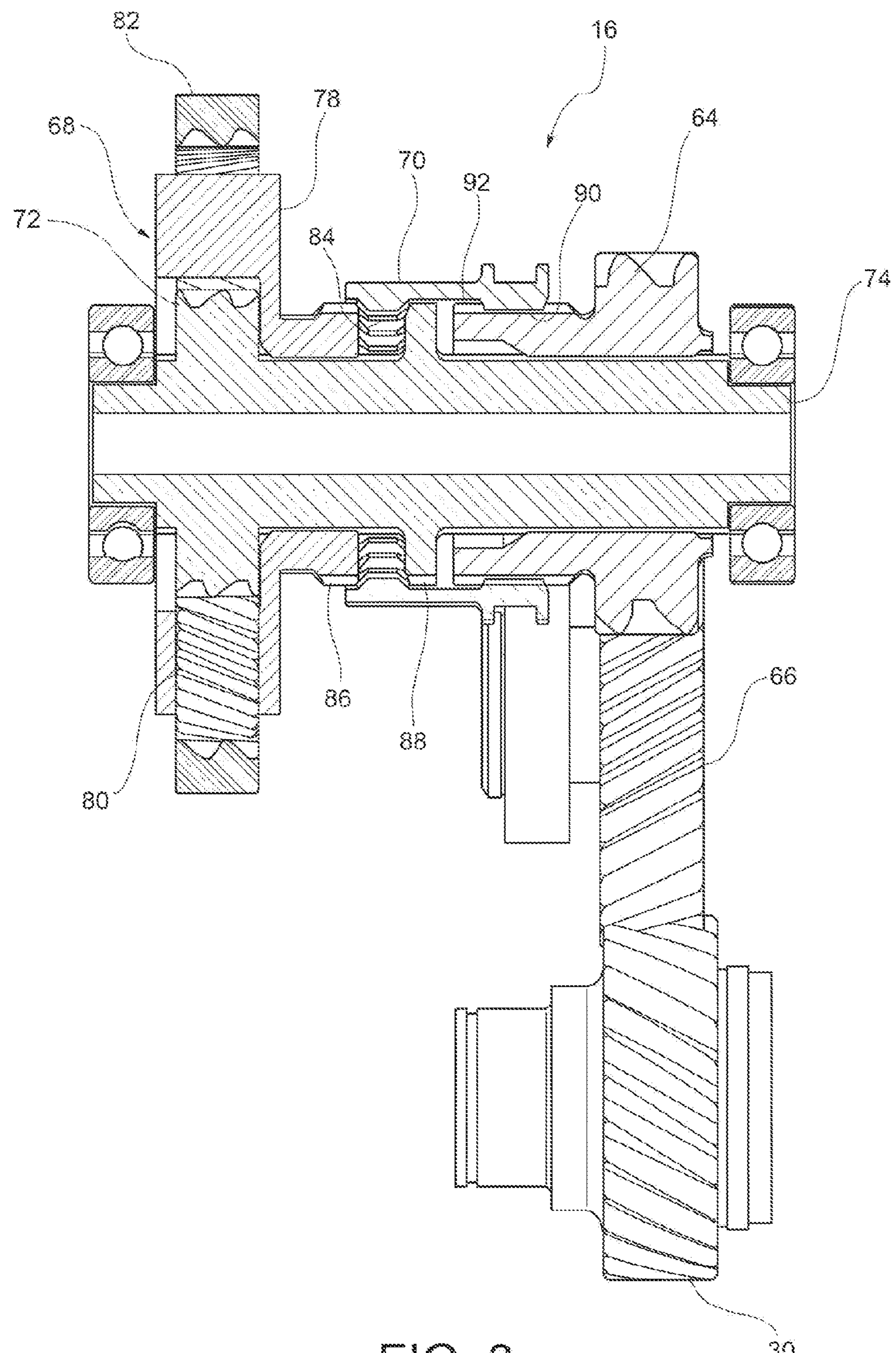
FIGS. 3 and 4 are a section view and a front view, respectively, which show in detail, on an enlarged scale, the secondary gearbox (i.e. the gearbox associated to the electric machine) of the transmission of FIG. 1.
Figure 4:
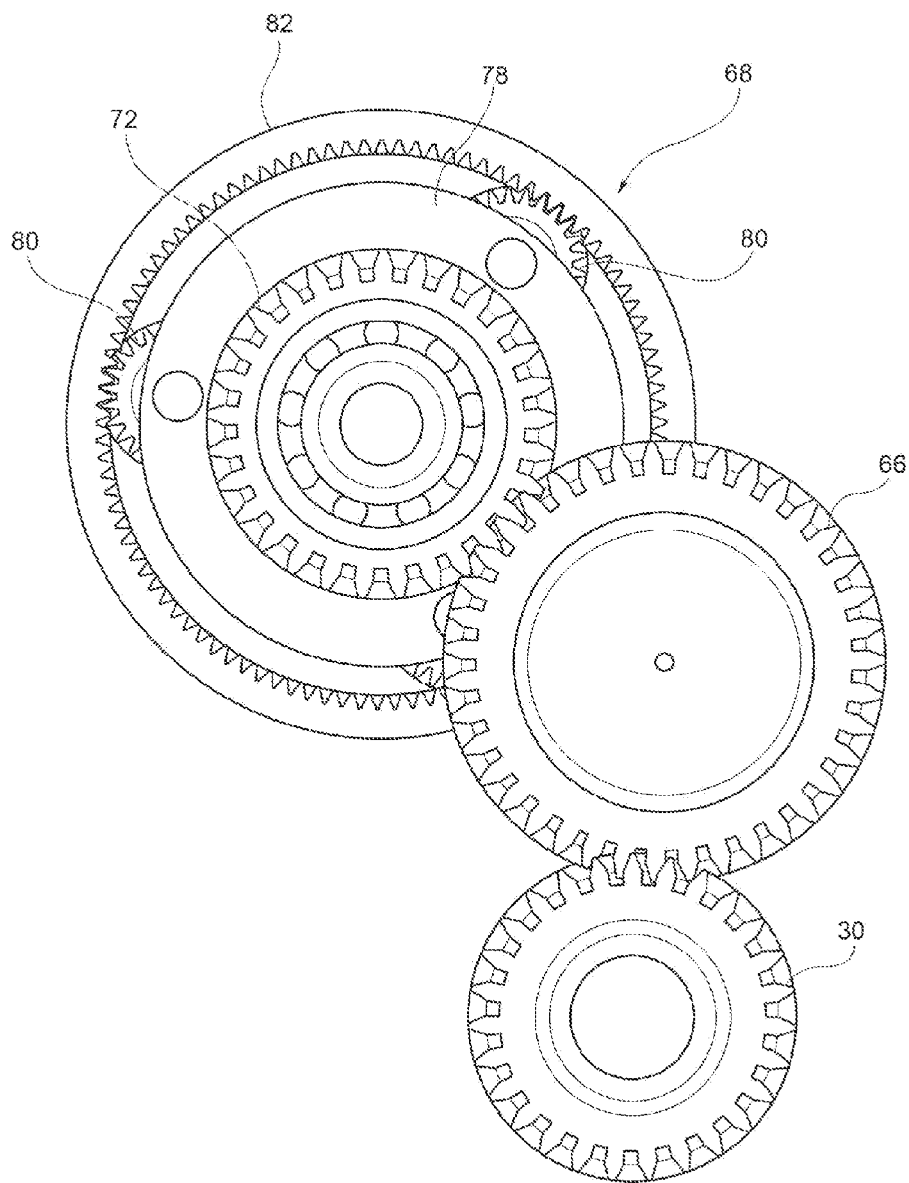

The secondary gearbox 16 allows to change the transmission ratio with which the electric machine 14 transmits the motion to the driving gearwheel 30 of the main gearbox 12 and, if necessary, even to disconnect the electric machine 14 from the main gearbox 12. In the proposed embodiment, the secondary gearbox 16 comprises a reduction mechanism 68 interposed between the output shaft 62 and the output gearwheel 64 of the electric machine 14 and a coupling device 70 adapted to connect the output gearwheel 64 for rotation alternatively with the reduction mechanism 68 or with the output shaft 62. In this way, with the output gearwheel 64 connected for rotation with the reduction mechanism 68 the electric machine 14 transmits the motion to the main gearbox 12 with a first transmission ratio (low gear), the torque passing through the output shaft 62, the reduction mechanism 68, the output gearwheel 64 and the intermediate gearwheel 66, or vice versa (depending on the electric machine 14 working as a motor or as a generator), whilst with the output gearwheel 64 directly connected for rotation with the output shaft 62 the electric machine 14 transmits the motion to the main gearbox 12 with a second transmission ratio (high gear), the torque passing through the output shaft 62, the output gearwheel 64 and the intermediate gearwheel 66, or vice versa (depending on the electric machine 14 working as a motor or as a generator). More specifically, with reference also to FIGS. 3 and 4, in the proposed embodiment the reduction mechanism 68 is a planetary reduction mechanism and comprises a sun gear 72, which is drivingly connected for rotation with an intermediate shaft 74 in turn connected for rotation, for example by means of a splined coupling 76, with the output shaft 62 of the electric machine 14, a planet carrier 78 carrying a plurality of planet gears 80 (three planet gears, in the proposed embodiment), and a ring gear 82. Both the planet carrier 78 and the output gearwheel 64 are idly mounted on the intermediate shaft 74. The coupling device 70 allows to connect alternatively the planet carrier 78 or the output gearwheel 64 for rotation with the intermediate shaft 74, and hence with the output shaft 62 of the electric machine 14. In the proposed embodiment, the coupling device 70 is made as a sliding sleeve and is provided on the one hand with first engagement teeth 84 (which are made as inner teeth in the illustrated example) adapted to mesh alternatively with corresponding engagement teeth 86 of the planet carrier 78 or with corresponding engagement teeth 88 of the intermediate shaft 74 (both these teeth being made as outer teeth in the illustrated example) and on the other hand with second engagement teeth 90 (which are made as inner teeth in the illustrated example) permanently meshing with corresponding engagement teeth 92 (which are made as outer teeth in the illustrated example) of the output gearwheel 64. The coupling device 70 is shiftable between a first engagement position (left-hand position with respect to a person looking at FIG. 2), in which it connects the planet carrier 78 for rotation with the output gearwheel 64, thus implementing the low gear, a second engagement position (right-hand position with respect to a person looking at FIG. 2), in which it connects the intermediate shaft 74, and hence the output shaft 62, for rotation with the output gearwheel 64, thus implementing the high gear, and a neutral position, in which the output gearwheel 64 is connected neither to the planet carrier 78 nor to the intermediate shaft 74.

Some of the various operating conditions of the transmission 10 will be described now, with reference to FIGS. 5 to 15, in which the gear sets associated to the first, the second, the third, the fourth, the fifth and the sixth gear of the main gearbox 12 are indicated with the roman numerals I, II, III, IV, V and VI, respectively, while the positions of the coupling device 70 of the secondary gearbox 16 corresponding to the engagement of the low gear and of the high gear are indicate with L and H, respectively. In each of the schematic drawings shown in FIGS. 5 to 15, the torque path in the transmission is indicated with an arrow.

Figure 5:
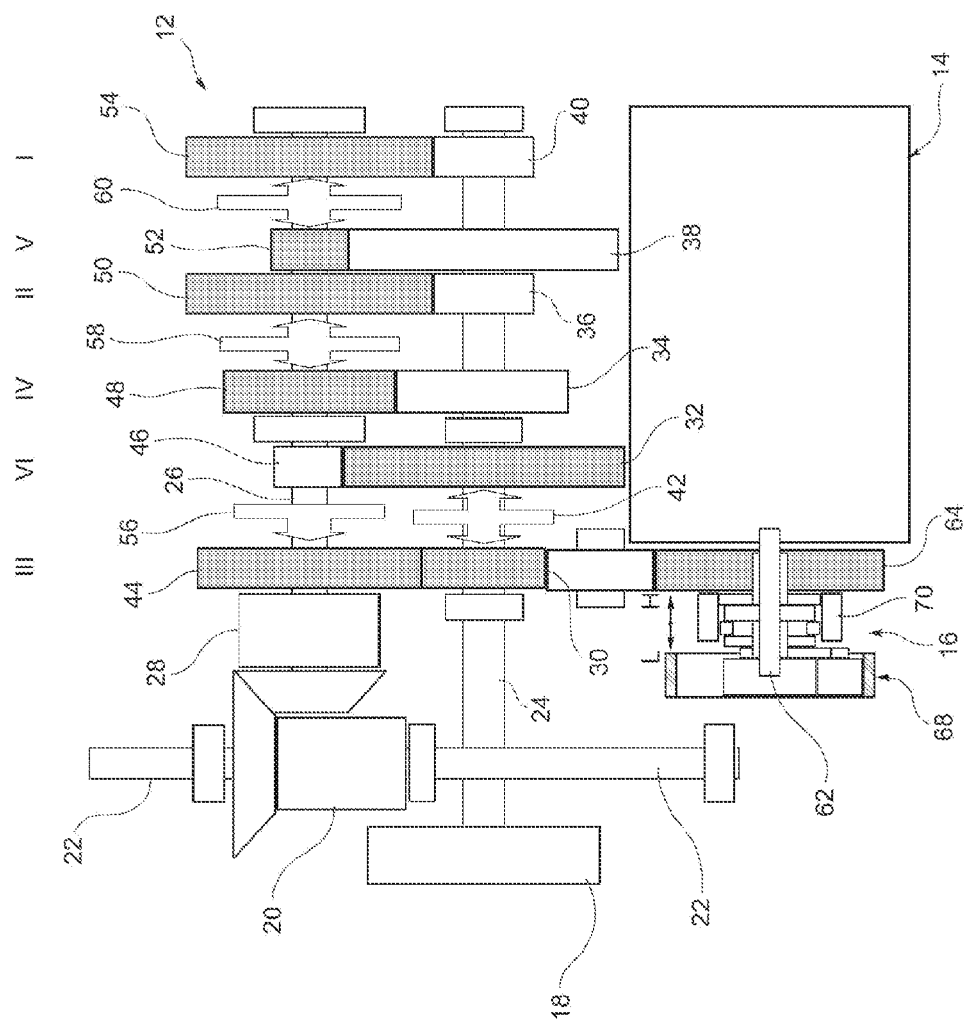
FIG. 5 is a schematic view of the transmission of FIG. 1 in the neutral condition.

FIG. 5 shows the neutral condition of the transmission 10, in which all the three coupling devices 42, 56 and 58 of the main gearbox 12 and the coupling device 70 of the secondary gearbox 16 are in the neutral position. In this condition, therefore, neither the internal combustion engine nor the electric machine 14 transmit torque to the vehicle wheels.

FIGS. 6 to 11 refer to the condition in which the coupling device 56 of the main gearbox 12 is in the engagement position. In this condition, the electric machine 14 can be connected to the secondary shaft 26 of the main gearbox 12 by moving the coupling device 70 of the secondary gearbox 16 into the first or the second engagement position and can therefore transmit torque to the vehicle wheels in parallel to the internal combustion engine. In this connection, it shall be noted that having a secondary gearbox associated to the electric machine makes it possible for this latter to operate in the optimal number of revolutions per minute conditions (maximum efficiency) in a wider speed range of the motor vehicle.

Figure 6:
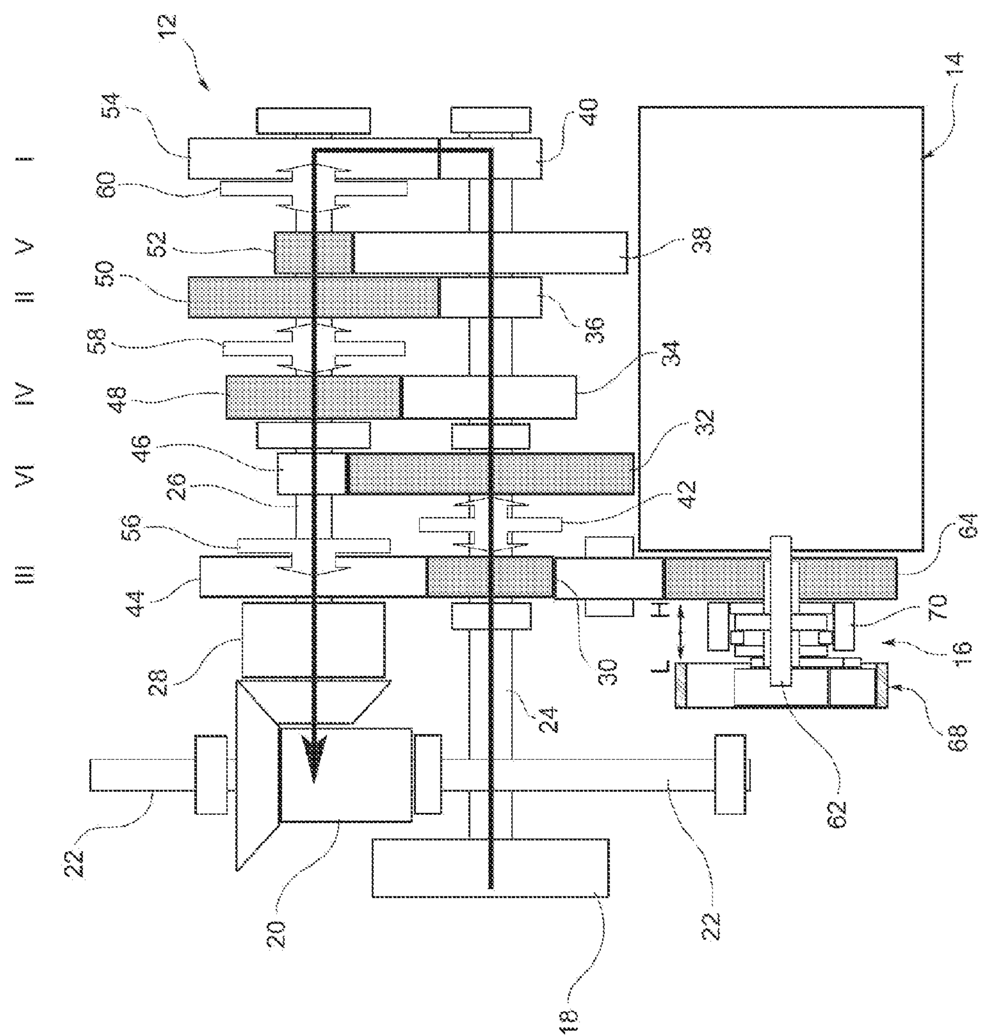
FIG. 6 is a schematic view of the transmission of FIG. 1 in hybrid mode traction condition with the first gear engaged.

FIG. 6 shows the condition of engagement of the first gear, obtained by moving the coupling device 60 into the second engagement position defined above, in which this device connects the driven gearwheel 54 of first gear for rotation with the secondary shaft 26. The transmission of the motion from the primary shaft 24 to the secondary shaft 26 of the main gearbox 12 takes place therefore through the gear set of first gear formed by the driving gearwheel 40 and by the driven gearwheel 54.

Figure 7:
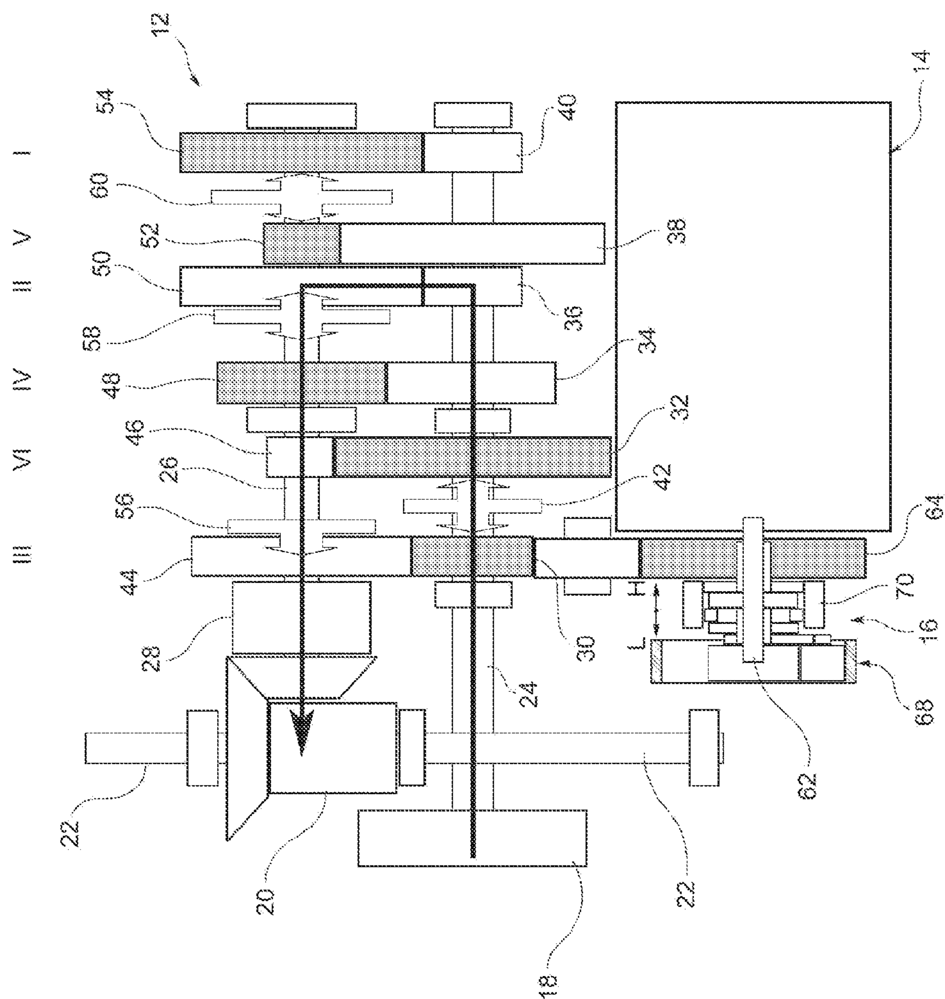
FIG. 7 is a schematic view of the transmission of FIG. 1 in hybrid mode traction condition with the second gear engaged.

FIG. 7 shows the condition of engagement of the second gear, obtained by moving the coupling device 58 into the second engagement position defined above, in which this device connects the driven gearwheel 50 of second gear for rotation with the secondary shaft 26. The transmission of the motion from the primary shaft 24 to the secondary shaft 26 of the main gearbox 12 takes place therefore through the gear set of second gear formed by the driving gearwheel 36 and by the driven gearwheel 50.

Figure 8:
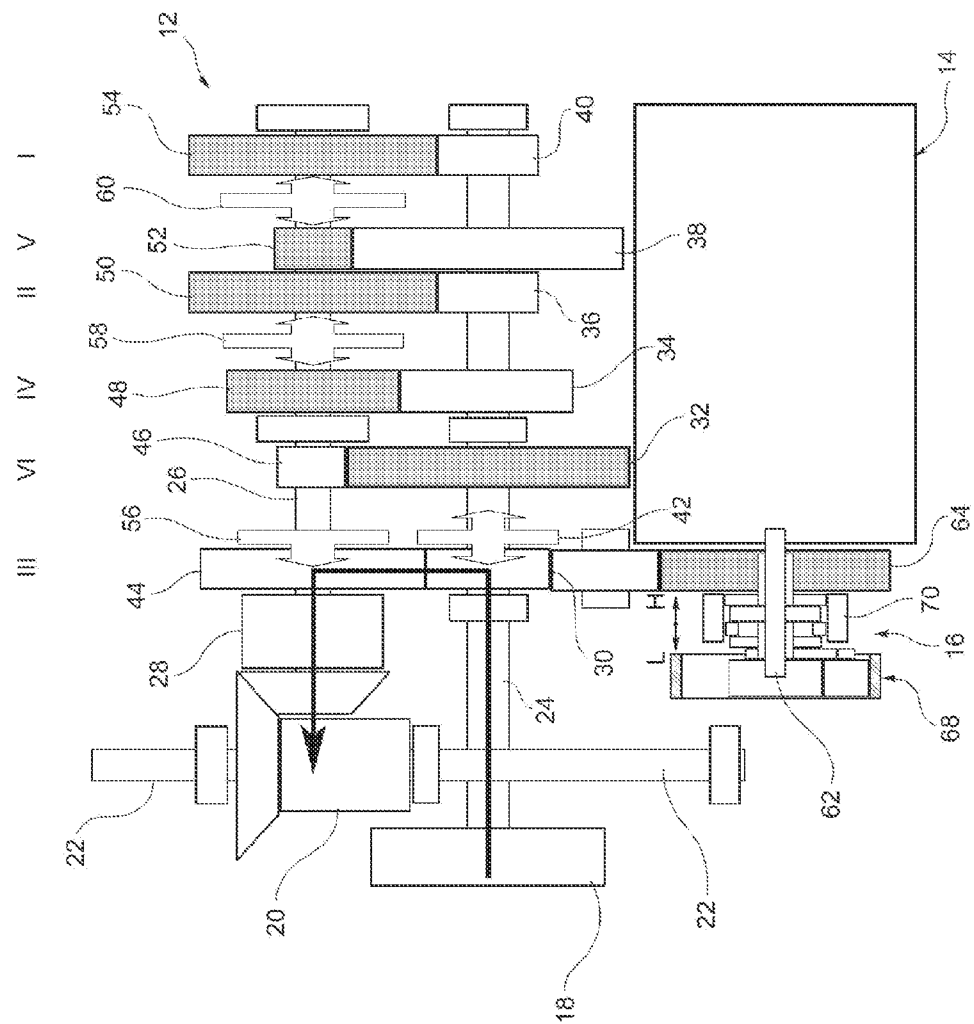
FIG. 8 is a schematic view of the transmission of FIG. 1 in hybrid mode traction condition with the third gear engaged.

FIG. 8 shows the condition of engagement of the third gear, obtained both by moving the coupling device 42 into the first engagement position defined above, in which this device connects the driving gearwheel 30 of third gear for rotation with the primary shaft 24, and by moving the coupling device 56 into the first engagement position defined above, in which this device connects the driven gearwheel 44 of third gear for rotation with the secondary shaft 26. The transmission of the motion from the primary shaft 24 to the secondary shaft 26 of the main gearbox 12 takes place therefore through the gear set of third gear formed by the driving gearwheel 30 and by the driven gearwheel 44.

Figure 9:
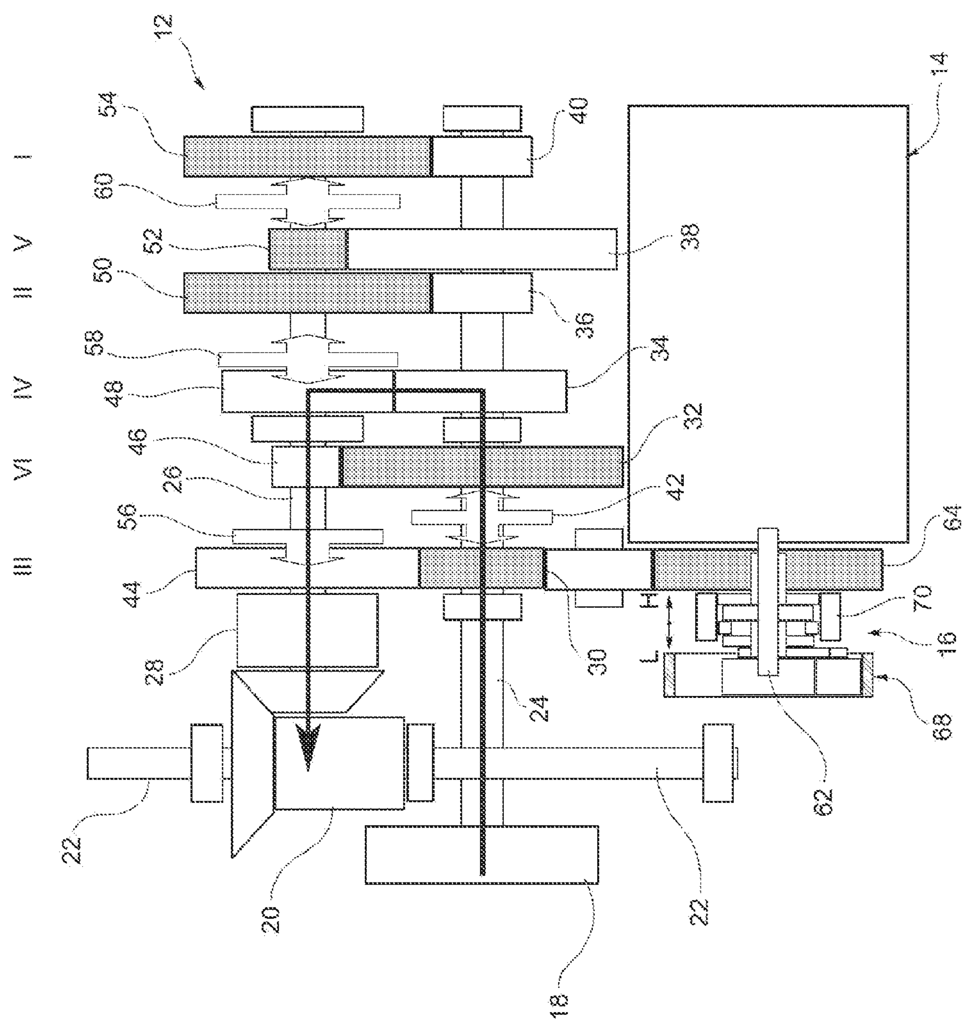
FIG. 9 is a schematic view of the transmission of FIG. 1 in hybrid mode traction condition with the fourth gear engaged.

FIG. 9 shows the condition of engagement of the fourth gear, obtained by moving the coupling device 58 into the first engagement position defined above, in which this device connects the driven gearwheel 48 of fourth gear for rotation with the secondary shaft 26. The transmission of the motion from the primary shaft 24 to the secondary shaft 26 of the main gearbox 12 takes place therefore through the gear set of fourth gear formed by the driving gearwheel 34 and by the driven gearwheel 48.

Figure 10:
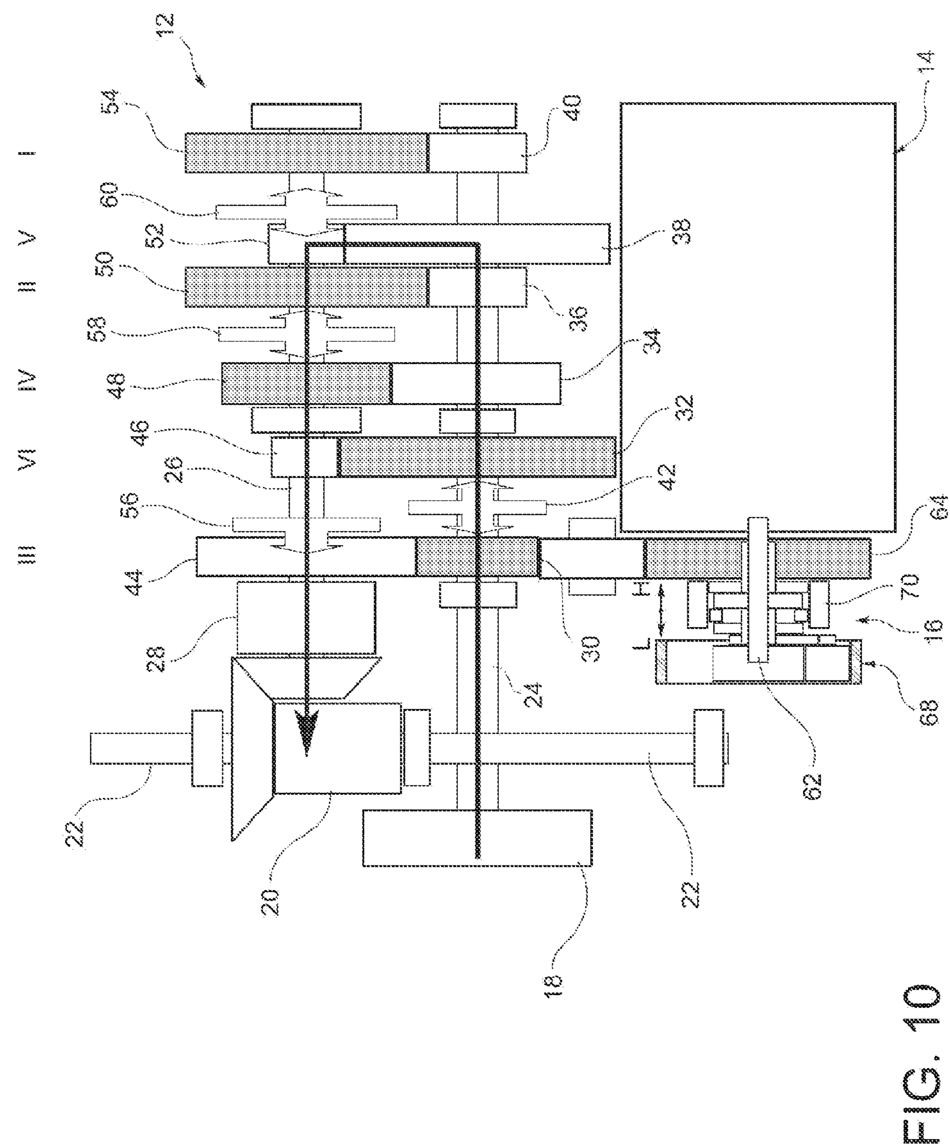
FIG. 10 is a schematic view of the transmission of FIG. 1 in hybrid mode traction condition with the fifth gear engaged.

FIG. 10 shows the condition of engagement of the fifth gear, obtained by moving the coupling device 60 into the first engagement position defined above, in which this device connects the driven gearwheel 52 of fifth gear for rotation with the secondary shaft 26. The transmission of the motion from the primary shaft 24 to the secondary shaft 26 of the main gearbox 12 takes place therefore through the gear set of fifth gear formed by the driving gearwheel 38 and by the driven gearwheel 52.

Figure 11:
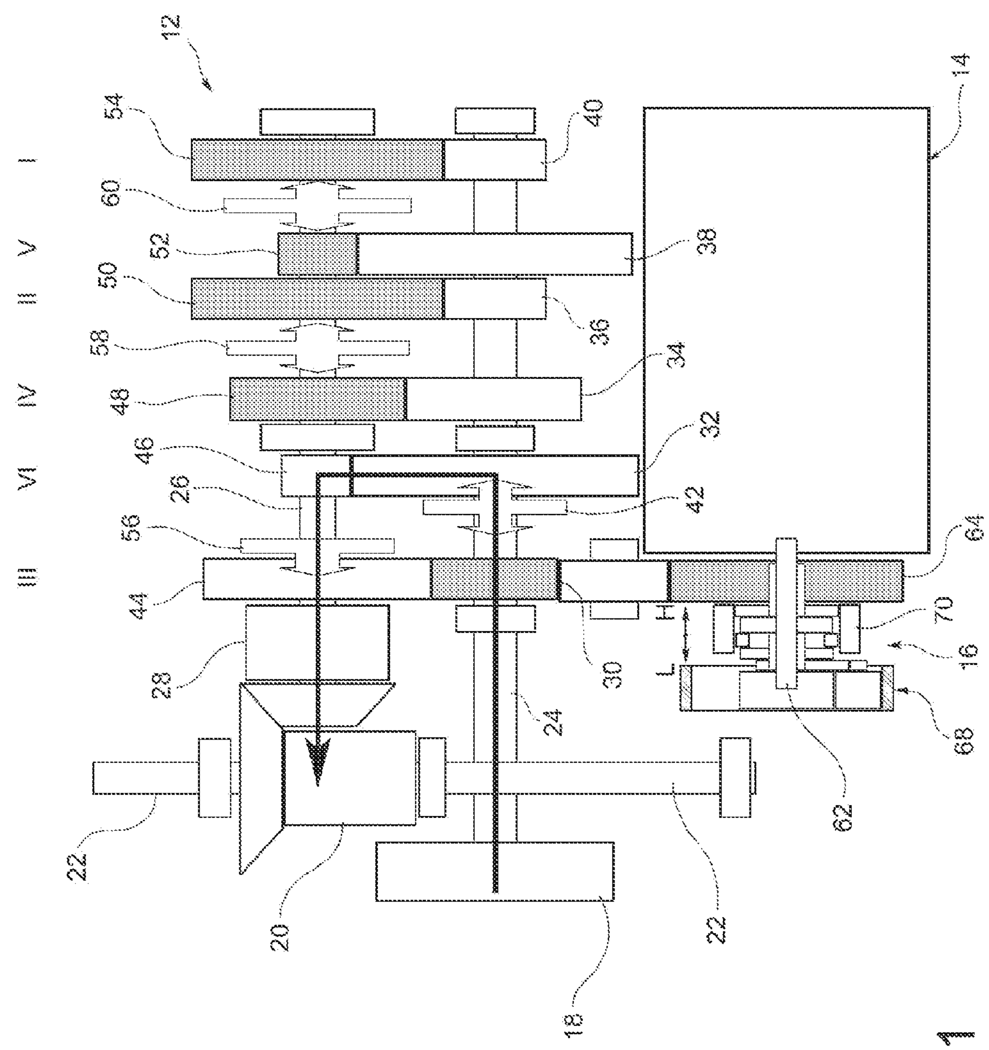
FIG. 11 is a schematic view of the transmission of FIG. 1 in hybrid mode traction condition with the sixth gear engaged.

FIG. 11 shows the condition of engagement of the sixth gear, obtained by moving the coupling device 42 into the second engagement position defined above, in which this device connects the driving gearwheel 32 of sixth gear for rotation with the primary shaft 24. The transmission of the motion from the primary shaft 24 to the secondary shaft 26 of the main gearbox 12 takes place therefore through the gear set of sixth gear formed by the driving gearwheel 32 and by the driven gearwheel 46.

Figure 12:
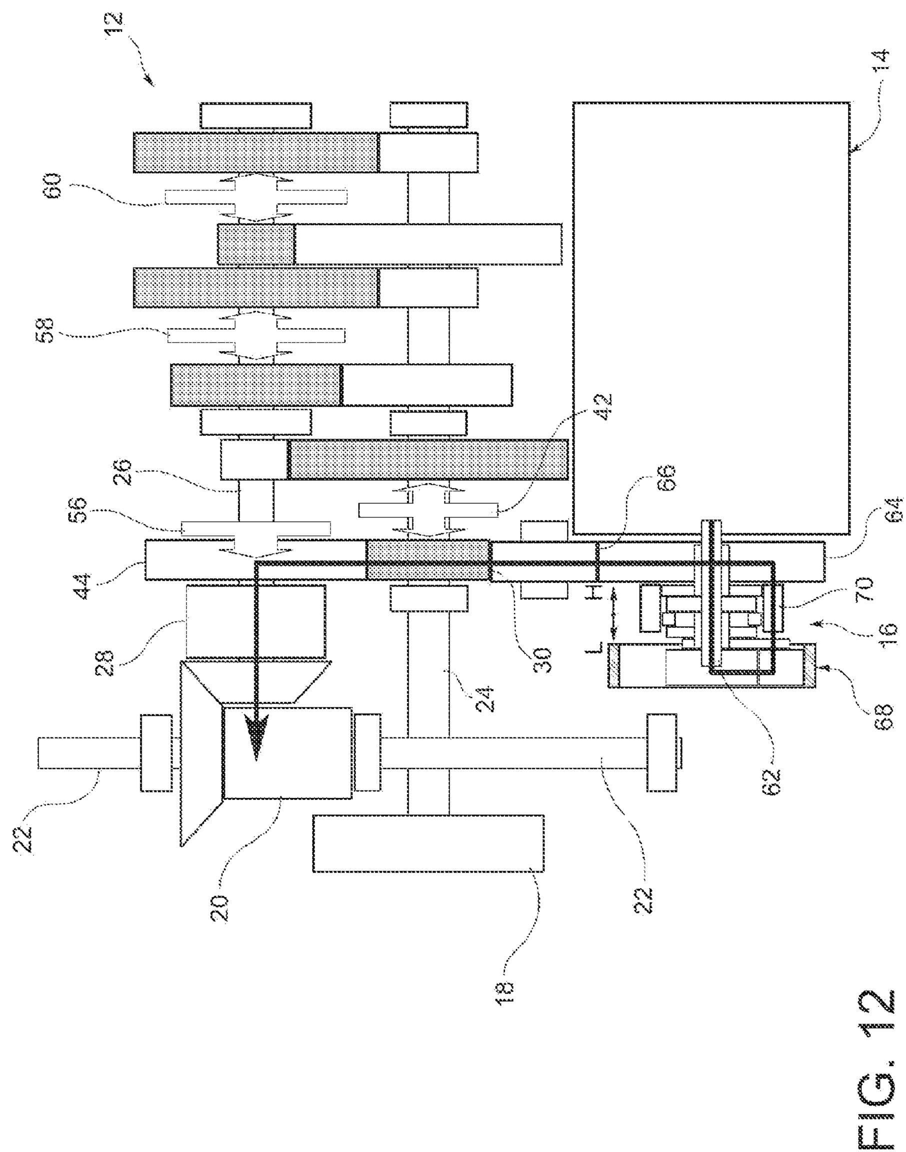
FIG. 12 is a schematic view of the transmission of FIG. 1 in purely electric mode traction condition with the first gear of the secondary gearbox engaged.
Figure 13:
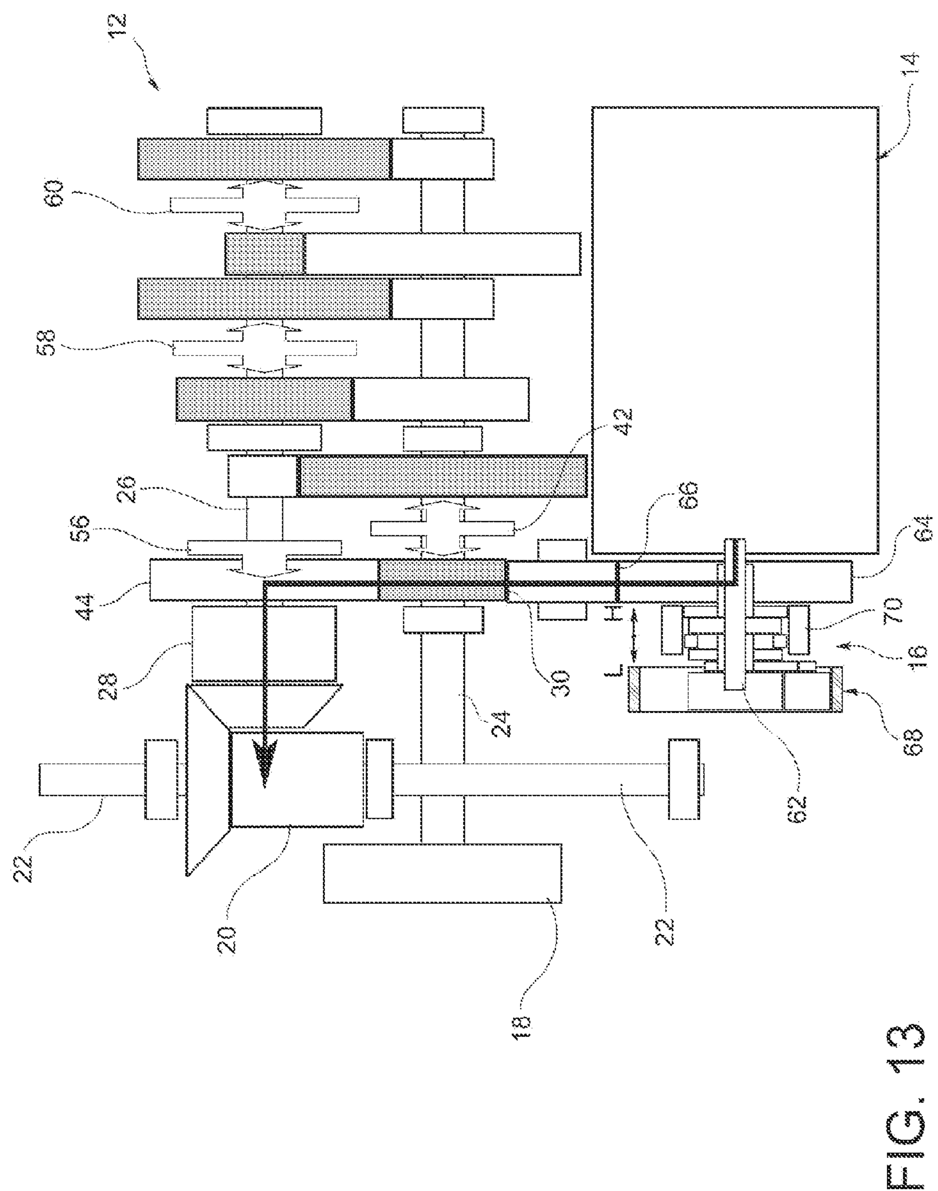
FIG. 13 is a schematic view of the transmission of FIG. 1 in purely electric mode traction condition with the second gear of the secondary gearbox engaged.

FIGS. 12 and 13 show the purely electric operating condition of the transmission, in which the electric machine 14 is connected to the secondary shaft 26 of the main gearbox by virtue of the coupling device 56 being in the first engagement position (and hence the driven gearwheel 44 being connected for rotation with the secondary shaft 26) and in which the coupling device 70 of the secondary gearbox 16 is in the first or second engagement position. All the other coupling devices 42, 58 and 60 of the main gearbox 12 are held in the neutral position. In the condition illustrated in FIG. 12 the electric machine 14 transmits torque with the low gear engaged, whilst FIG. 13 refers to the condition of engagement of the high gear of the secondary gearbox 16.

Figure 14:
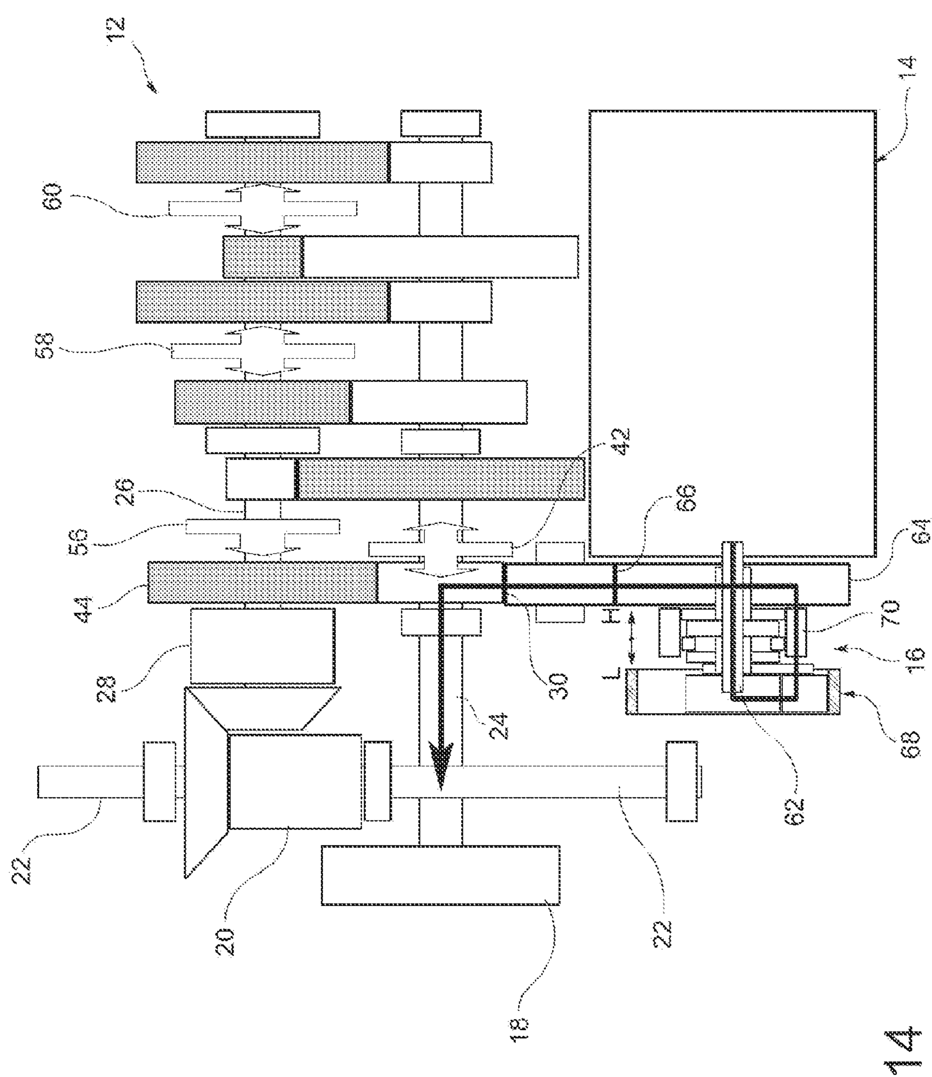
FIG. 14 is a schematic view of the transmission of FIG. 1 in the condition in which the electric machine is connected to the internal combustion engine of the vehicle with the first gear of the secondary gearbox engaged.
Figure 15:
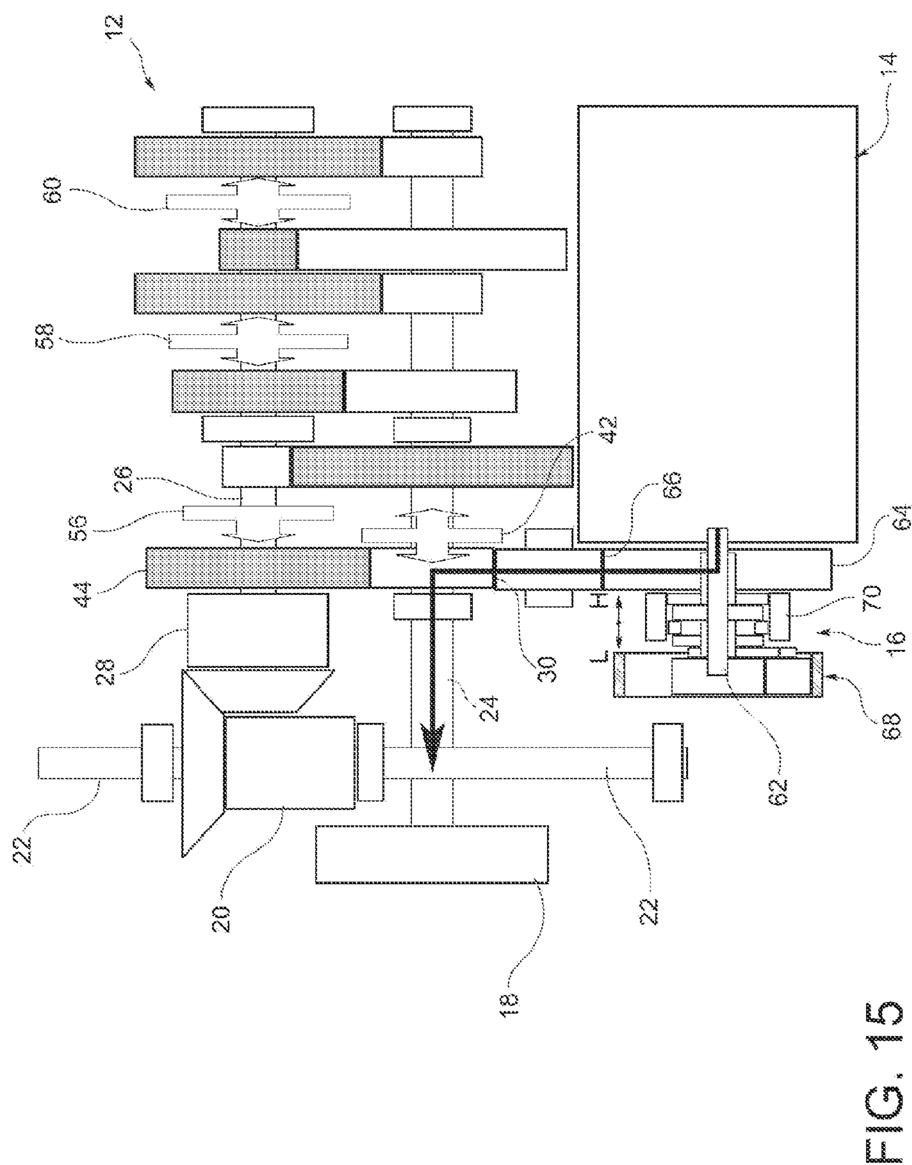
FIG. 15 is a schematic view of the transmission of FIG. 1 in the condition in which the electric machine is connected to the internal combustion engine of the vehicle with the second gear of the secondary gearbox engaged.

Finally, FIGS. 14 and 15 refer to the condition in which the electric machine 14 is connected to the primary shaft 24 of the main gearbox 12 and therefore, through the friction clutch 18, to the internal combustion engine of the vehicle, to operate either as a starting motor for starting the internal combustion engine or as a generator to generate current for charging the batteries on board of the vehicle. In such a condition, the coupling device 42 is in the first engagement position, so as to connect the driving gearwheel 30 for rotation with the primary shaft 24, while the coupling device 70 of the secondary gearbox 16 may be placed in the first or second engagement position, as shown in FIG. 14 and in FIG. 15, respectively. All the other coupling devices 56, 58 and 60 of the main gearbox 12 are held in the neutral position.

To summarize, the hybrid transmission according to the invention is thus able to operate in the following operating modes:

non-hybrid traction mode, in which the electric machine is neither connected to the input side (primary shaft) nor to the output side (secondary shaft) of the transmission and therefore the vehicle wheels receive torque only from the internal combustion engine;

hybrid traction mode, in which the electric machine is connected to the output side of the transmission (secondary shaft) with one or more transmission ratios (two transmission ratios, in the proposed embodiment) and operates as a motor to generate torque for the vehicle wheels in parallel to the internal combustion engine;

purely electric traction mode, in which the electric machine is connected to the output side of the transmission (secondary shaft) with one or more transmission ratios (two transmission ratios, in the proposed embodiment) and operates as a motor to generate torque for the vehicle wheels in place of the internal combustion engine; such a mode may be used either when driving in purely electric mode (either in drive or in reverse, this latter being obtained by inverting the direction of rotation of the electric machine) or during the shift phases of the main gearbox to compensate for or at least reduce the interruption in the transmission of the torque (the so-called "torque hole") that occurs when shifting from one gear to the other;

starting mode, in which the electric machine is connected to the input side of the transmission (primary shaft) and works as a starting motor to start the internal combustion engine of the vehicle;

generation mode, in which the electric machine is connected to the input side of the transmission (primary shaft) and receives the motion from the internal combustion engine of the vehicle to work as an electric power generator to charge the batteries on board of the vehicle; and kinetic energy recovery mode, in which the electric machine is connected to the output side of the transmission (secondary shaft) and receives the motion from the vehicle wheels to work as an electric power generator to charge the batteries on board of the vehicle; in such an operating mode the resisting torque from the electric machine causes a braking effect on the vehicle wheels and can thus be used as a braking assisting means.

Naturally, the principle of the invention remaining unchanged, the embodiments and the constructional details may vary widely from those described and illustrated purely by way of non-limiting example, without thereby departing from the scope of the invention as defined in the attached claims.

What is claimed is:

1. Hybrid transmission for a motor vehicle, comprising a main gearbox and a single electric machine, wherein the main gearbox is a mechanical gearbox with a plurality of gears and comprises at least one primary shaft adapted to be connected to a drive shaft of an internal combustion engine of the vehicle, and at least one secondary shaft adapted to be connected to vehicle wheels;

wherein the electric machine is releasably connected both to said at least one primary shaft and to said at least one secondary shaft by a connection gear set, which includes a first gearwheel idly mounted on said at least one primary shaft and a second gearwheel idly mounted on said at least one secondary shaft and directly or indirectly meshing with said first gearwheel, so as to allow the transmission of the torque between the electric machine and said at least one primary shaft and said at least one secondary shaft;

a first coupling device interposed between the electric machine and said at least one primary shaft to control connection between the electric machine and said at least one primary shaft, and a second coupling device interposed between the electric machine and said at least one secondary shaft to control connection between the electric machine and said at least one secondary shaft, wherein said first coupling device is shiftable into an engaged position, in which said first coupling device connects said first gearwheel for rotation with the respective primary shaft, and into a disengaged position, in which said first coupling device disconnects said first gearwheel from the respective primary shaft, and said second coupling device is shiftable at least into an engaged position, in which said second coupling device connects said second gearwheel for rotation with the respective secondary shaft, and into a disengaged position, in which said second coupling device disconnects said second gearwheel from the respective secondary shaft, in such a manner that with said first coupling device in the engaged position the electric machine is able to transmit torque to the primary shaft on which said first gearwheel is mounted, while said second coupling device is in the engaged position the electric machine is able to transmit torque to the secondary shaft on which said second gearwheel is mounted;

a secondary gearbox with two or more gears interposed between the electric machine and said first gearwheel or said second gearwheel.

2. Transmission according to claim 1, wherein the main gearbox comprises a plurality of gear sets which are adapted to implement each a respective gear and comprise each a driving gearwheel carried by said at least one primary shaft and a driven gearwheel carried by said at least one secondary shaft and directly or indirectly meshing with the respective driving gearwheel, and wherein said connection gear set forms part of said plurality of gear sets.

3. Transmission according to claim 2, wherein said connection gear set is adapted to implement an intermediate gear of the main gearbox.

4. Transmission according to claim 3, wherein the main gearbox is a gearbox with six gears and wherein said connection gear set is adapted to implement the third gear of the main gearbox.

5. Transmission according to claim 1, wherein the electric machine comprises an output shaft and an output gearwheel idly mounted on the output shaft and connected for rotation with said first gearwheel or with said second gearwheel, wherein the secondary gearbox comprises a reduction mechanism interposed between the output shaft and the output gearwheel and a coupling device associated to the output gearwheel, wherein the reduction mechanism comprises an input member and an output member, and wherein the coupling device of the secondary gearbox is shiftable at least into a first engagement position, in which the coupling device of the secondary gearbox connects the output gearwheel for rotation with the output member to implement a first gear, or low gear, of the secondary gearbox, and into a second engagement position, in which the coupling device of the secondary gearbox connects the output gearwheel for rotation directly with the output shaft to implement a second gear, or high gear, of the secondary gearbox.

6. Transmission according to claim 5, wherein the reduction mechanism is a planetary reduction mechanism.

7. Transmission according to claim 5, wherein the coupling device of the secondary gearbox is also shiftable into a neutral position, in which the coupling device of the secondary gearbox disconnects the output gearwheel both from the output shaft and from the output member.

8. Transmission according to claim 6, wherein the coupling device of the secondary gearbox is also shiftable into a neutral position, in which the coupling of the secondary gearbox disconnects the output gearwheel both from the output shaft and from the output member.

* * * * *